United States Patent [19]
Poque

[11] 3,861,436
[45] Jan. 21, 1975

[54] PNEUMATIC TIRE TREAD

[75] Inventor: Dionysius Josef Poque, Aachen-Brand, Germany

[73] Assignee: Uniroyal A.G., Aachen, Germany

[22] Filed: Oct. 19, 1973

[21] Appl. No.: 408,210

[30] Foreign Application Priority Data
Nov. 2, 1972 Germany............................ 2253717

[52] U.S. Cl............................................ 152/209 R
[51] Int. Cl............................................. B60c 11/06
[58] Field of Search ................................ 152/209 R

[56] References Cited
UNITED STATES PATENTS

| | | | |
|---|---|---|---|
| 2,068,050 | 1/1937 | Bishop ........................... | 152/209 R |
| 2,124,821 | 7/1938 | Hubach........................... | 152/209 R |
| 2,612,928 | 10/1952 | Buddenhagen.................. | 152/209 R |
| 2,878,852 | 3/1959 | Lippmann et al................ | 152/209 R |
| 3,004,578 | 10/1961 | Braudorn ........................ | 152/209 R |
| 3,177,917 | 4/1965 | Walters et al................... | 152/209 R |

Primary Examiner—Drayton E. Hoffman
Attorney, Agent, or Firm—Philip Sands, Esq.

[57] ABSTRACT

A tread for a pneumatic tire, the tread comprising a plurality of adjoining sections which extend adjacent one another in succession circumferentially of the tire. The sections are arranged relative to one another such that adjacent sections differ from one another and impart to the tread various characteristics over their respective discrete circumferential extents.

7 Claims, 6 Drawing Figures

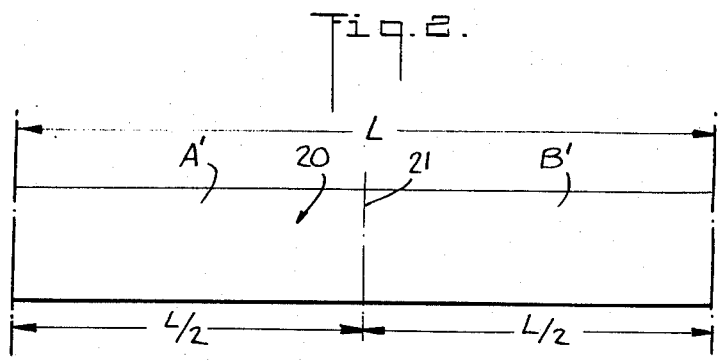
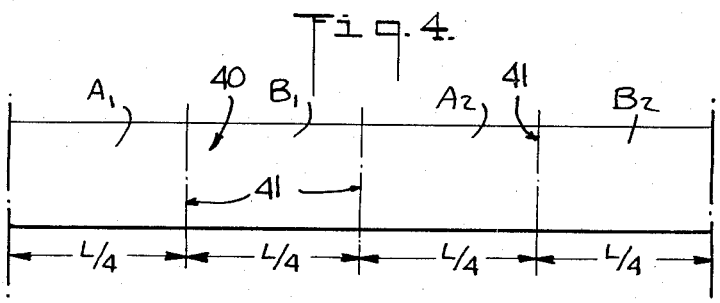
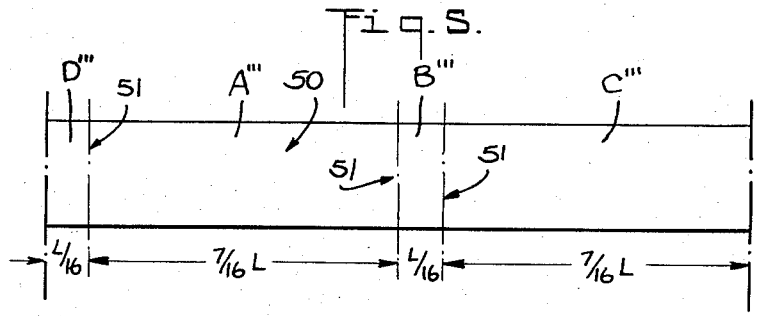
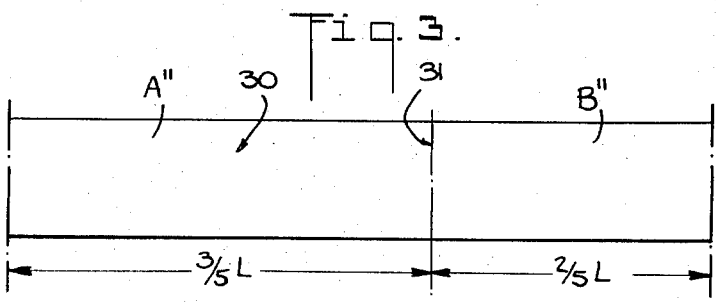

PNEUMATIC TIRE TREAD

BACKGROUND OF THE INVENTION

The present invention relates generally to pneumatic tires, and more particularly to a tread for a pneumatic tire.

As is well known, each type of road surface, whether it be dry, wet or covered with snow or ice, has an appreciable and different effect upon the extent of traction that the tread can generate thereupon. Thus, the design of the raised projections, ribs or cleats of the tread, which define therebetween grooves or the like, must account for such considerations as well as others; for example, the frequency and intensity of noise generated by the tire upon various surfaces at different speeds.

By altering the configuration and size of the raised projections, as well as the depth of the grooves, it has been determined that the tread will present different traction capacities, noise levels and wear in the course of its service. Accordingly, many designs of treads have been utilized heretofore, each design accounting for the particular purpose or purposes that the tread is to serve.

In the main, treads are designed such that the raised elements are juxtapositioned relative to one another in a uniform manner circumferentially of the tire. Such designs may, however, include an arrangement whereby the raised elements, although being identical, are in circumferential rows which are staggered relative to one another in a direction axially of the tire for reducing, to some extent, the noise level generated by the tread in the course of its use at high speeds. Other designs include arrangements wherein the raised projections, within their respective circumferential rows, are identical, but different from those which are in rows which are axially adjacent thereto. It has been determined, however, notwithstanding the numerous conventional modes of design, that conventional treads do not most effectively satisfy all of the demands made thereon.

SUMMARY OF THE INVENTION

Accordingly, it is an object of the present invention to provide a new and effective tire tread which will effectively resist wear and reduce the extent of noise generated by the tire as it is utilized at high speeds, and which presents a high traction capacity upon all types of road surfaces and under all types of weather conditions.

To this end, the present invention may be characterized as a tire tread comprising a plurality of adjoining sections which extend adjacent one another in succession circumferentially of the tire. The sections each have different physical characteristics for respectively satisfying, successively, different demands and conditions.

In this respect, the physical characteristics of certain of the sections may be chosen so as to be effective upon particular types of road surfaces, whereas others of the sections may be designed so as to be effective under particular types of weather conditions. In the first instance, the road surfaces may be of the type which is constituted of soil or mud, or, alternatively, of the type which accommodates normal vehicular traffic; namely, public highways and the like, each demanding different degrees of traction from the tread. In the second instance, weather conditions such as rain, snow or ice impart to the various surfaces, requirements which demand, likewise, different degrees of traction.

Still others of the sections may be designed so as to reduce the extent of noise that the tread generates at high speeds, whereas others of the sections may be chosen so as to most effectively reduce the extent of wear of the tread on the various surfaces.

It has been determined that, further to the relationship of the present invention wherein the tread sections differ from one another in succession circumferentially of the tire, the tread sections should preferably also be designed such that they substantially present uniform characteristics over the entire tread width. It has likewise been determined that it is effective to design such a tread with at least one groove that closes upon itself throughout the entire circumference of the tread, and with the sections arranged relative to one another such that any one section is interposed between two adjacent sections which differ from one another and from the section interposed therebetween.

It will be understood, that each of the sections is provided with spaced raised elements which define a pattern or profile array for satisfying a given one or combination of the aforementioned conditions. Each such section or pattern thereof may differ from the others with regard to the circumferential extent thereof, and/or the number and size of the raised elements per unit area of the tread, and/or the configuration of each of the raised elements, and/or the arrangement and orientation of the raised elements relative to one another within each such section.

BRIEF DESCRIPTION OF THE DRAWINGS

The above and additional objects and advantages of this invention will be more clearly understood from the following detailed description thereof when read in conjunction with the accompanying drawing, in which:

FIGS. 2 through 5 schematically illustrate, respectively, further embodiments pursuant to the present invention.

DETAILED DESCRIPTION OF THE INVENTION

Figure 1:
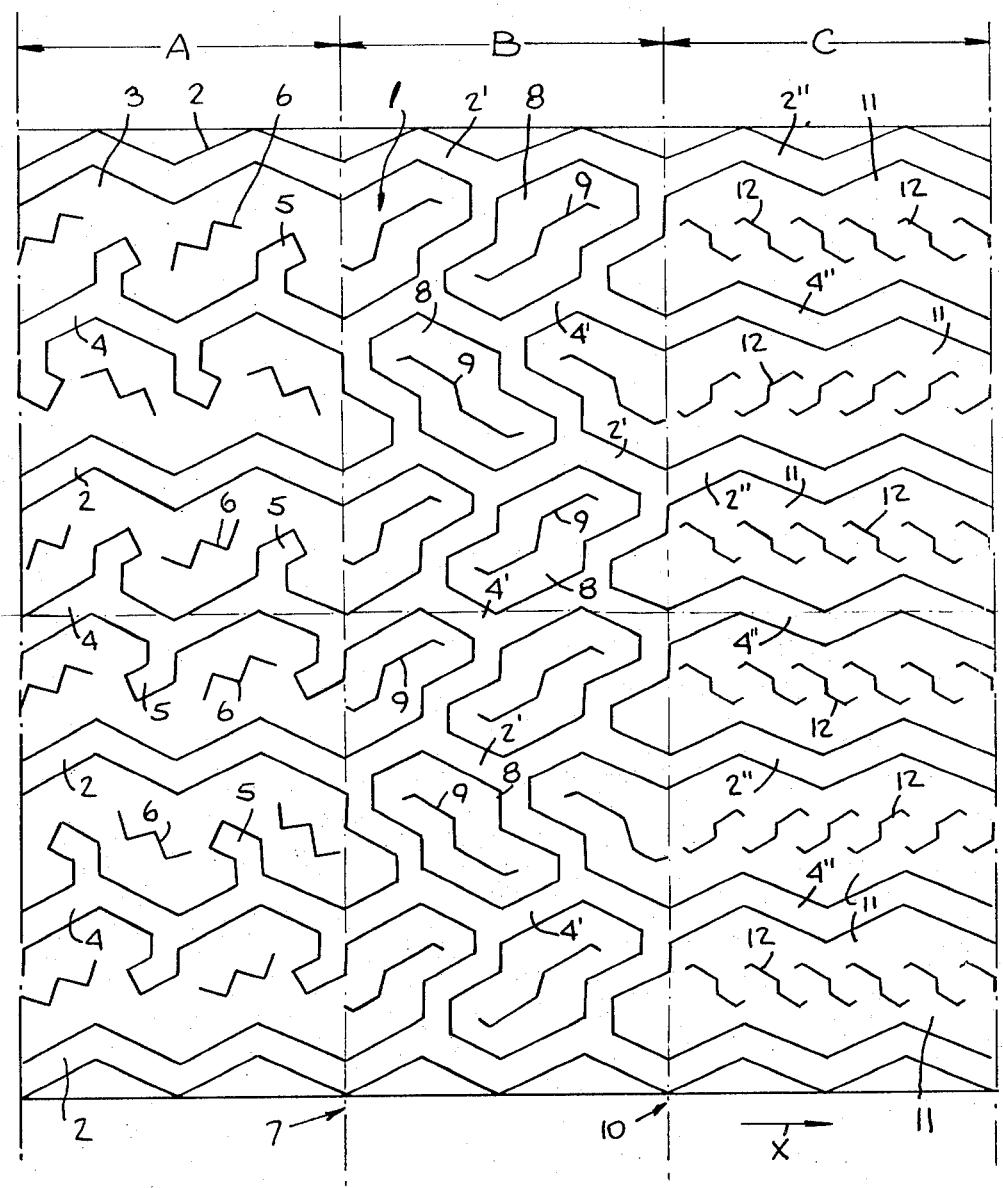
FIG. 1 is a schematic plan view illustrating a portion of one embodiment of a tread pursuant to the present invention.

One embodiment pursuant to the present invention is illustrated in FIG. 1, schematically. The tread is denoted generally by the reference character 1 and is provided with three sections A, B and C, respectively, each section presenting a different array of zig-zag grooves 2 which are defined by spaced raised elements 3. The raised elements 3, which are in the form of ribs or cleats and the like, likewise define further zig-zag grooves 4 which alternate with, are different from, and extend in the same direction as the grooves 2; namely, circumferentially of the tread 1 in the direction of arrow X.

Each groove 4 is provided with angled branch-like portions 5 which in part extend generally axially of the tread 1 or perpendicularly of the arrow X. The raised elements 3 are, preferably, provided with small zig-zag slit-like recesses 6.

The second section B extends adjacent the first section A and merges with the latter at a transition 7 therebetween of substantially zero length. The section B is provided with raised elements 8 which are discrete and isolated from one another through the intermediary of respective grooves 2' and 4' which correspond to the grooves 2 and 4 in section A and which extend into section B from section A. The raised elements 8 in the section B are provided with slit-like recesses 9 and blend harmoniously with the raised projections 3 in the section A at the transition 7 therebetween.

Adjacent the section B and separated from the latter through a transition 10, likewise of substantially zero length, is a further section C. The section C is provided with raised projections 11 which extend generally in zig-zag fashion in a direction circumferentially of the tread 1 in the direction of arrow X. The raised projections 11 are, in a manner similar to the raised projections 8 in section B and the raised projections 3 in section A, provided with slit-like recesses 12 which are smaller than, but correspond to, the configuration of the slit-like recesses 9 provided in each of the raised projections 8 in section B.

Section C is likewise provided with grooves 2'' and 4'' which correspond with the grooves 2 and 4 in section A and the grooves 2' and 4' in section B. It will be understood that the grooves 2, 2' and 2'', in particular, communicate directly with one another and close upon themselves throughout the entire circumference of the tread 1 in the direction of arrow X. This prevents the entrapment of rain in the tread at the transition zones 7 and 10, and reduces its tendency to skid.

It has been determined that, pursuant to the present invention, the sections of the tread 1 may differ from one another not merely in appearance, but also with regard to their respective circumferential extents. In a second embodiment illustrated in FIG. 2, the tread 20 has a circumferential extent L divided into two sections A' and B' of equal extent L/2 at the transition 21. The sections A' and B' differ, however, from one another with respect to the appearance and relationship of the raised projections and grooves thereof. However, in a third embodiment illustrated in FIG. 3, the tread 30 has two sections A'' and B'' which are not only different with respect to the appearance and relationship of their raised projections and grooves, but also with regard to their respective circumferential extents, e.g., section A'' has a circumferential extent of 3/5 L and section B'' an extent of 2/5 L. The sections A'' and B'' are separated from one another at the transition 31 therebetween.

A similar comparison of further embodiments can be made by referring to FIGS. 4 and 5. In the embodiment of FIG. 4, the tread 40 is divided into four sections of identical circumferential extent (L/4) at respective transitions 41. The sections are denoted by reference characters $A_1$, $B_1$, $A_2$ and $B_2$, respectively. Each of the sections, although having identical extents, differ from one another with respect to the appearance and configuration of their respective raised projections and grooves. On the other hand, in the embodiment of FIG. 5, the tread 50 is divided into four sections A''', B''', C''' and D''', respectively at the transitions 51 therebetween. In this instance, not only do the sections differ from one another in appearance, but also with regard to their respective circumferential extents. Sections A''' and C''' have identical extents (7/16 L), but differ from the common extent (L/16) of each of the sections B''' and D'''.

It will be understood, although not shown in FIGS. 2–5, that each embodiment respectively illustrated is preferably provided with at least one groove that is common to all of the sections and closes upon itself throughout the entire circumferential extent of the tread.

Figure 6:
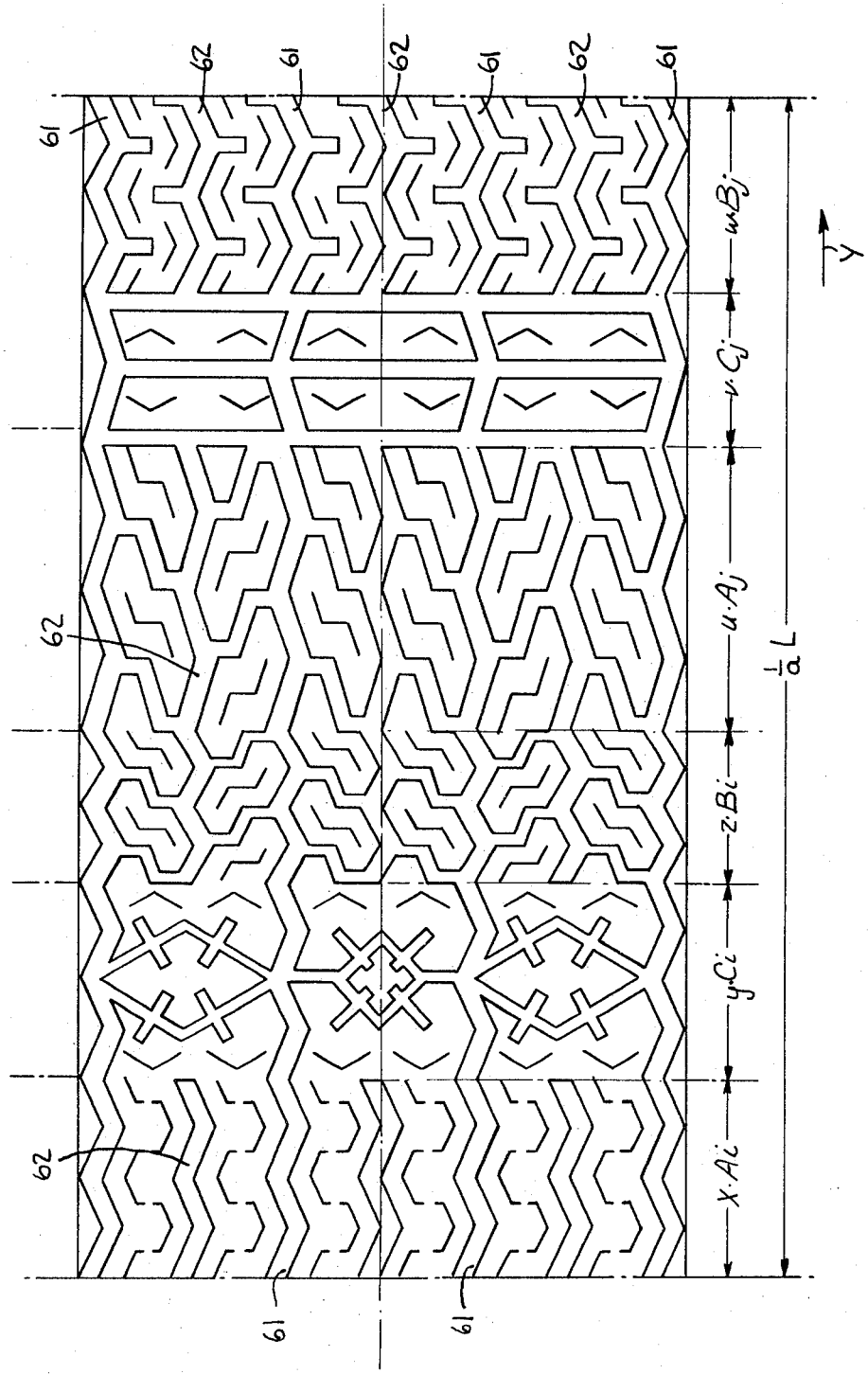
FIG. 6 is a view similar to FIG. 1, and illustrates a preferred embodiment of a tread portion pursuant to the present invention.

FIG. 6 illustrates still a further embodiment of the present invention wherein the tread 60 has a circumference which extends generally in the direction of arrow Y. The tread 60 is provided with a plurality of sections A, B and C which adjoin one another in succession. The sections are not only different in physical characteristics and appearance, but are, moreover, different with respect to their respective circumferential extents. Each of the sections A, B and C is subdivided into two subsections which are somewhat similar to one another, but in certain respects are also different from one another. Hence, each subsection of the section A, each subsection of the section B and each subsection of the section C is distinguished from its corresponding subsections by what is characterized herein as profile pattern indices $i$ and $j$.

The relationship of the subsections can be expressed by the following formula:

$$L = a\,(xAi + yBi + zCi + uAj + vBj + wCj),$$

wherein $a =$ the number of times that the parameters within the parentheses are repeated;

$x, y, z, u, v$ and $w =$ the number of times that the parameters $Ai$, $Bi$, $Ci$, $Aj$, $Bj$ and $Cj$ are repeated;

$Ai$, $Bi$, $Ci$, $Aj$, $Bj$ and $Cj =$ adjoining subsections which in succession differ from one another; and $L =$ the circumferential extent of the tread.

It will be understood that each section has a discrete circumferential length, none of which is shown as a variable or parameter in the above equation for purposes of clarity.

It will be noted from FIG. 6, that the tread 60 is provided with grooves 61 and 62 which alternate with one another axially of the tread or perpendicularly to the direction of arrow Y. Furthermore, each of the grooves 61 in each of the subsections communicate directly with one another from subsection to subsection, and close upon themselves throughout the entire circumferential extent of the tread.

In order to optimize performance of the tread 60 and ensure optimal distribution of the different sections or subsections over the tread circumference, whether the sections or subsections be repeated or not, each section or subsection is interposed between two other sections or subsections which are not only different from one another, but are also different from the section or subsection interposed therebetween.

It will be understood that the foregoing description of preferred embodiments of the present invention is for purposes of illustration only, and that the various structural and operational features and relationships herein disclosed are susceptible to a number of modifications and changes none of which entails a departure from the spirit and scope of the present invention as defined in the hereto appended claims.

What is claimed is:

1. A tread for a pneumatic tire, said tread comprising; a first group of at least three different adjoining sections extending adjacent to one another side-by-side in circumferential succession, each of said sections over the entire extent of said tread including a respective tractive means in the form of projections and grooves different in size and configuration from the others of said sections immediately adjacent thereto on each side thereof for responding to a road-surface condition with a degree of traction different from the others of said sections immediately adjacent thereto on each side thereof, said tractive means of each of said sections defining at least one circumferential groove which continuously communicates with a corresponding groove in every other section and closes upon itself over the circumferential extent of said tread; and a second group of at least three different adjoining sections each of which corresponds to a respective section of said first group, each section of said second group which corresponds to a respective section of said first group having substantially similar circumferential grooves as its corresponding section but differing from its corresponding section in the presence or absence therefrom of at least one groove intercommunicating its circumferential grooves with one another laterally of said tread, each of said corresponding sections being separated from one another by at least two other non-corresponding sections over the entire circumferential extent of said tread.

2. A tread as claimed in claim 1, wherein the circumferential grooves of the corresponding sections are substantially identically spaced laterally from one another.

3. A tread as claimed in claim 2, wherein said tractive means of at least one of said sections of each of said groups defines at least one circumferential groove which is discontinuous at at least one other section immediately adjacent thereto.

4. A tread as claimed in claim 1, wherein each of said sections includes an array of raised elements which are spaced from one another and define grooves therebetween, each of said sections having an array which in configuration differs from the others.

5. A tread as claimed in claim 4, wherein the configuration of each said array is different from the others with respect to the size of said raised elements per unit area of the tread.

6. A tread as claimed in claim 4, wherein the configuration of each said array is different from the others with respect to the orientation of said raised elements relative to one another.

7. A tread as claimed in claim 1, wherein each of said sections has an extent circumferentially of the tread which differs from the others.

* * * * *